UNITED STATES PATENT OFFICE.

ALEXANDER L. STRAUS, OF BALTIMORE, MARYLAND, ASSIGNOR TO THE BALTIMORE PROCESS COMPANY, OF BALTIMORE, MARYLAND, A CORPORATION OF DELAWARE.

NON-ALCOHOLIC BEVERAGE.

1,337,850. Specification of Letters Patent. Patented Apr. 20, 1920.

No Drawing. Application filed July 15, 1919. Serial No. 310,888.

*To all whom it may concern:*

Be it known that I, ALEXANDER L. STRAUS, a citizen of the United States, residing at Baltimore, in the State of Maryland, have invented certain new and useful Improvements in Non-Alcoholic Beverages; and I do hereby declare the following to be a full, clear, and exact description of the invention, such as will enable others skilled in the art to which it appertains to make and use the same.

This invention relates to an improved non-alcoholic beverage or composition of matter made from fermented malt liquors, and has for its object to provide a beverage of this character which will more closely resemble in taste the particular liquor from which it was derived than those heretofore proposed.

With this and other objects in view the invention consists in the novel beverages or compositions of matter hereinafter disclosed and particularly pointed out in the claims.

In producing this beverage I prefer to follow the procedures outlined in my prior Patents #1,231,121, dated April 17, 1917, for process for making a non-alcoholic beverage, and #1,265,274, May 7, 1918, entitled Non-alcoholic beverage. That is to say, I prefer to make alcoholic beer or ale in any usual or ordinary manner, to deprive it of its alcoholic content, and to then add flavor restoring constituents all as will presently appear.

In order that this beverage may be easily distinguished from others and in order that a preferred process of producing the same may be readily at hand, I will suppose one hundred barrels of fermented malt liquor such as ale or beer is to be treated in a single operation. This quantity is first boiled in a brewer's kettle, or substantially all the alcohol is otherwise removed as by evaporation at a pressure lower than that of the atmosphere.

The boiling of the beer not only removes the alcohol, but it also removes a considerable portion of the water, substantially all of the hops, as well as other well known constituents, so that the original beer has its character profoundly changed in the production of the resulting alcohol free liquor, which constitutes the base or raw material for making the desired non-alcoholic beverage.

In order to restore the original taste of the original beer or other fermented malt liquor from which the raw material is derived, I add to the boiled product or raw material a quantity of water preferably in a heated condition which will be equivalent to the quantity of water that has been evaporated, and I add to every ten barrels of said raw material when the boiling operation is nearing its close about one pound of common salt, and at about one half hour before the boiling operation is completed, I add one fifth of a pound of hops and two ounces of gum arabic or other foam producing material per barrel of the boiling beverage, or raw material.

I prefer to add the water after the boiling operation rather than before, because it will be readily appreciated that should one add water before boiling out the alcohol the albuminoids and other flavor carrying materials will be heated in a comparatively weak solution, their chemical nature will not be precisely what it would be in a comparatively strong solution after the boiling operation, and therefore their flavors will not be precisely the same as are found after a boiling in a strong solution and the addition of water to bring them to the desired dilution.

I next add a sweetening material such as one and three quarter pounds of a carbohydrate sweetening material, such as sugar and, preferably granulated cane sugar, per barrel, and I also add to the entire beverage product now being boiled, and at about ten minutes before the boiling operation is completed, three pounds of concentrated hops. By concentrated hops I mean hops of a different character from the ordinary hops, that is, I mean pure hops from which the dirt, seed and impurities, foreign matter, etc., have been removed. The addition of the hops and foregoing materials will prevent turbidity in the finished product and add to its keeping qualities. About one half hour before the kettle is empty, or about the time the hops are added, I place in the kettle about one pound of citric acid to each one hundred barrels of beer. The actual amount of citric acid may be varied somewhat to suit individual tastes, but its addition gives to the beer along with the other materials added, that peculiar snappy taste which is so characteristic of high quality beers, and therefore it increases the difficulty of distinguishing between the flavor of my non-alcoholic beer and said other high class alcoholic beers. The temperature of the beverage thus produced may now be rapidly reduced to 4° C., by running it through any suitable cooler, and during this process of cooling, I add one half ounce of liquid quassia or an equivalent bitter tasting material per barrel of the beverage. This liquid quassia is conveniently produced by taking one ounce of commercial quassia and boiling it in a sufficient quantity of water to produce 16 ounces of liquor, and I then add one half to one ounce of this liquid thus obtained per barrel of the beverage while the beverage is being cooled as above stated. In some cases the quassia may be omitted, and the hops alone depended upon to give the bitter flavor.

It is, of course, obvious that syrups or any sweetening materials other than sugar may be employed, and that one or more of the foregoing ingredients may be added before the boiling operation, but I prefer to add them in the order stated, as I get the best results by so doing. A convenient way to add these ingredients is to make up one or more of them into a prepared syrup, observing the proper proportions, and to add the syrup before, during, or after the boiling operation, according to the taste desired. Especially is it convenient to add the syrup and salt together.

After the beverage has passed the cooler it may be run into a chip-cask and while in the chip-cask I may add finings in the manner usual with the ordinary brewing of beer. I also prefer to add a suitable quantity of a chill proofing preparation, preferably a pepsin compound known to the trade as "caluperline."

While the beverage is in storage, I may add a suitable preservative such as say four commercial sized tablets of meta-bisulfite of potassium known to the trade as "K. M. S." or their equivalent per barrel. After the beverage has been in storage from say two to five days it may be filtered and carbonated at from say fifteen to sixteen pounds of carbonic acid gas pressure, and it is then ready for the market. It will be observed that in producing this beverage the following steps are observed:—

First: The beer is brewed from malt hops and cereals.

Second: Substantially all the alcohol is eliminated and some of the water present, thus profoundly changing the character of the beer and producing a raw base material from which the finished beverage is later obtained.

Third: I restore the same quantity of water that has been eliminated preferably in a heated condition, and after the alcohol has been eliminated.

Fourth: I add say one pound of salt to every ten barrels of the product.

Fifth: I add one fifth of a pound of hops and two ounces of gum arabic per barrel and one pound of citric acid per hundred barrels of the beverage.

Sixth: There is added say one and three fourths pounds of granulated sugar or other sweetening material per barrel.

Seventh: I add to the entire beverage product approximately say ten minutes before the boiling operation is completed three pounds of concentrated hops. Of course, some or all of these additions can be made before the boiling operation, but I prefer to make them during, or after, said operation, as I have found that by so doing a superior flavor results.

Eighth: I rapidly reduce the temperature of the beverage to approximately 4° C.

Ninth: There is added say one half to one ounce of quassia liquor per barrel, or when preferred the quassia is omitted.

Tenth: There is added the usual quantity of finings.

Eleventh: There is added a suitable chill proofing preparation.

Twelfth: There is added say four commercial size meta-bisulfite of potassium tablets per barrel.

Thirteenth: The beverage is stored from say two to five days.

Fourteenth: The beverage is then filtered and carbonated to say fifteen to sixteen pounds pressure of carbonic acid gas.

Fifteenth: The finished beverage is now drawn off into packages ready for the market.

It will be observed that therefore this finished beverage can be readily distinguished from other somewhat similar beverages in that is contains as a base material fermented malt liquors such as beer from which all, or substantially all the alcohol has been boiled. It contains hops, salt, sugar, citric acid, (sometimes quassia), foam producing material, such as gum aragic, and a chill proofing material as well as dissolved meta-bisulfite of potassium or its equivalent in the proportions indicated above.

It therefore can be readily distinguished from other products not only by its taste which very closely indeed approximates the original beer, or other malt liquors from which it was derived, but by the presence of the above mentioned constituents. Not only does the above process produce a non-alcoholic beverage from ordinary beer or ale that has substantially the taste, and the appearance of the alcoholic liquor from which it was derived, but it is found to be nutritious as well.

It is obvious that those skilled in the art may vary the details of the product as well as the proportions of the parts without departing from the spirit of the invention, and therefore, I do not wish to be limited to the above disclosure except as may be required by the claims.

What I claim is:—

1. The herein described non-alcoholic beverage the same containing a base material consisting of a fermented malt liquor from which substantially all the alcohol has been eliminated, and containing added water, salt, citric acid, carbohydrate sweetening material and concentrated hops, substantially as described.

2. The herein described non-alcoholic beverage the same containing a base material consisting of a fermented malt liquor from which substantially all of the alcohol has been eliminated by boiling at a pressure lower than that of the atmosphere, and containing added water, salt, citric acid, a carbohydrate sweetening material, added hops and a bitter tasting material, substantially as described.

3. The herein described non-alcoholic beverage the same containing a base material consisting of a fermented malt liquor from which substantially all the alcohol has been eliminated by boiling at a pressure lower than that of the atmosphere, and containing added water to the amount evaporated during the boiling operation, and containing salt, citric acid, a carbohydrate sweetening material, added hops, a bitter tasting material and a foam producing material, substantially as described.

4. The herein described non-alcoholic beverage the same containing a base material consisting of a fermented malt liquor from which substantially all the alcohol has been eliminated, and containing salt, citric acid, a carbohydrate sweetening material, added hops, quassia, meta-sulfite of potassium, and substantially the same quantity of water that was present in the original malt liquor, substantially as described.

5. The herein described non-alcoholic beverage the same composed of a base material consisting of a fermented malt beer from which the alcohol has been eliminated and containing substantially the same quantity of water as the original beer, and also containing salt, added hops, citric acid, a sweetening material, a chill proof preparation, potassium meta-bisulfite and carbonic acid gas, substantially as described.

6. The herein described process of producing a non-alcoholic beverage, which consists in making an alcoholic fermented malt beverage in the usual way; boiling out its alcoholic content and a portion of its water; adding water after the boiling operation; adding to the fermented base material thus obtained a carbohydrate, sweetening material, salt, hops and citric acid; and carbonating the beverage thus produced, substantially as described.

7. The process of producing a non-alcoholic beverage which consists in providing a fermented malt beer; removing the alcohol present; then adding to said beer hot water, a carbohydrate sweetening material, salt, hops, and citric acid and carbonating the beverage thus produced, substantially as described.

In testimony whereof I affix my signature in presence of two witnesses.

ALEXANDER L. STRAUS.

Witnesses:
  M. BOWEN,
  H. KELLY.